(12) United States Patent
Abbing

(10) Patent No.: US 10,550,986 B2
(45) Date of Patent: Feb. 4, 2020

(54) DAMPENING VALVE UNIT

(71) Applicant: 3EFLOW AB, Luleå (SE)

(72) Inventor: Erik Abbing, Luleå (SE)

(73) Assignee: 3EFLOW AB, Lulea (SE)

( * ) Notice: Subject to any disclaimer, the term of this patent is extended or adjusted under 35 U.S.C. 154(b) by 36 days.

(21) Appl. No.: 15/738,294

(22) PCT Filed: Jun. 27, 2016

(86) PCT No.: PCT/EP2016/064832
§ 371 (c)(1),
(2) Date: Dec. 20, 2017

(87) PCT Pub. No.: WO2017/001328
PCT Pub. Date: Jan. 5, 2017

(65) Prior Publication Data
US 2018/0180210 A1    Jun. 28, 2018

(30) Foreign Application Priority Data
Jul. 2, 2015  (SE) ........................................ 1550945

(51) Int. Cl.
*E03B 7/07* (2006.01)
*F16L 55/055* (2006.01)
*F16L 55/053* (2006.01)

(52) U.S. Cl.
CPC ............ *F16L 55/055* (2013.01); *E03B 7/075* (2013.01); *E03B 7/078* (2013.01); *F16L 55/053* (2013.01)

(58) Field of Classification Search
CPC .. E03B 7/075; E03B 7/078; E03B 7/07; F16L 55/052; F16L 55/053; F16L 55/054; F16L 55/055
See application file for complete search history.

(56) References Cited

U.S. PATENT DOCUMENTS 3,343,560 A    9/1967 Nankivell
3,807,440 A    4/1974 Tibbals, Jr.
(Continued)

FOREIGN PATENT DOCUMENTS

DE      4406150 A1    9/1995
JP    2006010172 A    1/2006
(Continued)

OTHER PUBLICATIONS

International Search Report and Written Opinion from corresponding International Application No. PCT/EP2016/064832, dated Sep. 29, 2016.
(Continued)

*Primary Examiner* — Matthew W Jellett
(74) *Attorney, Agent, or Firm* — Tucker Ellis LLP

(57) ABSTRACT

A dampening valve unit (40) for use in a liquid distribution system, the liquid distribution system having a centrally located liquid source connected via a separate feeding conduit to a liquid tap unit. In the liquid distribution system each feeding conduit is evacuated of liquid when an associated tap unit is closed and refilled with liquid when the tap unit is opened. The unit (40) comprises a dampening chamber (26) which is connectable to said feeding conduit, and a liquid stop valve unit (1', 18), connectable at an inlet end (22) thereof, to said associated feeding conduit and which has an outlet end (24) being connectable in use to said associated liquid tap unit. Said dampening chamber (26) is adapted to collect gas and is connectable to said associated feeding conduit via a passage (23) which is located at said inlet end (22) of said liquid stop valve unit (1', 18). The dampening valve unit (40) and the feeding conduit in use form a closed system separated from the ambient air.

17 Claims, 14 Drawing Sheets

(56) References Cited

U.S. PATENT DOCUMENTS

| | | | | |
|---|---|---|---|---|
| 6,154,961 | A | * 12/2000 | Park | ............... B23P 15/00 |
| | | | | 29/890.14 |
| 2002/0053364 | A1* | 5/2002 | Kobayashi | ............ F16L 55/053 |
| | | | | 138/30 |
| 2014/0202543 | A1 | 7/2014 | Abbing | |
| 2014/0261763 | A1 | 9/2014 | Beckman | |
| 2015/0338012 | A1* | 11/2015 | Cogliati | ................. E03B 7/075 |
| | | | | 138/30 |
| 2017/0002967 | A1* | 1/2017 | Arndt | ..................... F16L 55/05 |

FOREIGN PATENT DOCUMENTS

| | | |
|---|---|---|
| WO | 9401706 A1 | 1/1994 |
| WO | 2008012726 A2 | 1/2008 |
| WO | 2011053237 A1 | 5/2011 |
| WO | 2012148351 A1 | 11/2012 |

OTHER PUBLICATIONS

International Preliminary Report on Patentability from corresponding International Application No. PCT/EP2016/064832, dated Oct. 26, 2017.
Swedish Office Action from Swedish Application No. 1550945-8 dated Mar. 18, 2016.

* cited by examiner

DAMPENING VALVE UNIT

FIELD OF TECHNOLOGY

The present invention concerns a dampening valve unit, for use in a liquid distribution system having a centrally located liquid source connected via at least one separate feeding conduit to at least one liquid tap unit. The at least one feeding conduit is evacuated of liquid when an associated tap unit is closed and refilled with liquid after the tap unit is opened. The dampening valve unit comprises a dampening chamber, which is connectable in use to at least one of said feeding conduit. It comprises also a liquid stop valve unit, which is connectable in use, at an inlet end thereof, to at least one of said associated feeding conduit and which has an outlet end being connectable in use to at least on of said associated liquid tap unit.

BACKGROUND ART

The present applicant has previously applied for a patent for the general system for example in WO2012148351. As is known per se from this patent application, the system operates in cycles, each comprising the following steps:
evacuating the liquid from the associated feeding conduit after completion of a tapping operation at the associated liquid tap unit, by generating a backward pressure gradient in the associated feeding conduit, so that the liquid flows backwards towards the liquid source and the associated feeding conduit thereafter contains only air or gas being retained therein, and
refilling, upon activating said liquid tap unit, the associated feeding conduit with liquid by generating a forward pressure gradient in the associated feeding conduit and permitting liquid to flow from the liquid source to the associated liquid tap unit, while pushing the remaining air or gas in the feeding conduit towards the associated liquid tap unit at an operating pressure exceeding an ambient air pressure level.

In the prior art system, as disclosed in the above-mentioned PCT application, each feeding conduit is connected to the liquid source by means of a single control valve, which can be open or closed. When it is open, the liquid source will feed liquid into the associated feeding conduit as long as the liquid tap unit signals that the flow of hot water should be maintained. When a tap unit is closed or deactivated, a signal is given so as to activate a centrally located pump which pumps back the liquid from the feeding conduit via the open control valve back to the liquid source. The same pump may be used for circulating hot water in the liquid source and for pumping back liquid from the feeding conduits. When a feeding conduit is completely evacuated, which is sensed by a level sensor, the control valve is closed again, so that the feeding conduit is retained at a relatively low pressure, slightly below the ambient air pressure, with only gas or air therein. Moreover, in the prior art system, air or gas will replace the liquid when it is evacuated from the feeding conduits. For this purpose, there is a special air valve adjacent to the liquid valve between the feeding conduit and the associated tap unit.

In order to have a smooth and practical function the applicant has improved parts of the previous system.

SUMMARY OF THE INVENTION

A problem with the known system is a pressure wave from when the water is refilling the conduits. Another problem is the risk of leaking water through the valve unit when letting out the air present in the conduits, after they have been emptied of water, during refilling the conduits with water.

Therefore, the applicant is applying for an improved system and method in a patent application filed the same day as the present application, wherein the liquid distribution operates at a relatively low pressure, when the liquid is evacuated after a tapping operation, and at a relatively high, but typically still fairly normal, pressure during a tapping operation. During the entire operation of the liquid distribution system, each of the feeding conduits is kept in communication with an associated, closed dampening chamber, preferably via an associated passage, accommodating an inlet of a liquid stop valve unit which is connected to an associated liquid tap unit, in use. The conduits and dampening chamber forms a closed gas system. During the refilling step, the refilling liquid is brought to flow through the conduit into the associated passage. The liquid stop valve is kept closed until the refilling liquid has reached the inlet. Thereafter, the liquid stop valve is caused to open, for example by way of an increased pressure at said inlet, so as to let liquid flow via the liquid stop valve and into the associated liquid tap unit, but no gas or air may pass the liquid stop valve unit. The gas present in the closed system is pushed in front of the refilling liquid into the dampening chamber during refilling of the conduit. Thus the risk of water leakage is delimited.

The present invention will concentrate on the dampening valve unit.

According to one aspect of the present invention a dampening valve unit comprises a dampening chamber, which is connectable in use to at least one of said feeding conduit. It comprises also a liquid stop valve unit, which is connectable in use, at an inlet end thereof, to at least one of said associated feeding conduit and which has an outlet end being connectable in use to at least on of said associated liquid tap unit. Said dampening chamber is adapted to collect gas and is connectable to said associated feeding conduit via a passage which is located in the vicinity of said inlet end of said liquid stop valve unit. The damping valve unit and the feeding conduit in use form a closed system being separated from the ambient air. Thus when the refilling liquid pushes the gas in front of the liquid both the gas and the liquid will be damped when the gas is compressed in the dampening chamber. Preferably the system has an under pressure in the conduits after the conduits are emptied. Thus the amount of gas, such as air, is limited and may quickly be compressed inside the dampening chamber. This makes also the refilling of liquid very quickly and a user opening a tap unit will almost immediately receive liquid.

According to one embodiment the liquid stop valve unit comprises at least one non-return valve. This safe guards in a simple and effective way that neither liquid nor gas may leak into the conduit from the tap unit.

According to one embodiment a pressure responsive part, separate or integrated, is provided in the liquid stop valve unit which biases the at least one liquid stop valve in a closed state.

According to another embodiment the pressure responsive part, integrated or separate, has an opening characteristic going from the closed state to an open state with no or an incremental increase of pressure or a decrease of pressure after a threshold pressure has been reached. This type of opening characteristics provides a quick opening and as little flow limitation as possible.

According to a further embodiment the pressure responsive part is a spring. According to a still further embodiment the spring has a non-linear load-deflection characteristic curve with a horizontal or negative portion, thus providing a long deflection after a threshold pressure has been reached.

According to one embodiment at least one small orifice liquid conduit/opening is connected to the passage at a first end thereof and to said at least one liquid stop valve at a second end thereof, the at least one small orifice liquid conduit/opening being capable of keeping liquid inside of it even when the passage is evacuated of liquid.

According to one embodiment the at least one liquid stop valve opens when liquid and a threshold pressure reaches the first end of the at least one small orifice liquid conduit/opening. Thus it is ascertained that no gas, such as air, can leak out through the liquid stop valve since it will not open until liquid has reached the inlet thereof.

According to one embodiment at least one gas stop valve is present at the inlet of the dampening chamber.

According to one embodiment an inlet valve is provided for letting gas into the dampening chamber and the gas stop valve is provided for letting gas out of the dampening chamber, the gas stop valve is provided with a pressure responsive part, the pressure responsive part, integrated or separate, having an opening characteristic going from the closed state to an open state with no or a slight increase of pressure or a decrease of pressure after a threshold pressure has been reached.

According to one embodiment the inlet valve opens at less than 0.1 bar pressure and the gas stop valve opens at a pressure difference of at least 2 bar, preferably 3 bar.

According to one embodiment a sensor for sensing pressure or another physical variable is provided downstream the at least one liquid stop valve in the liquid flow direction when the tap unit is open.

According to one embodiment a sensor for sensing pressure or another physical variable is provided in the liquid conduit and/or passage and/or dampening chamber and causes the liquid stop valve to open when: liquid has reached the passage; a threshold pressure has been reached; or the threshold pressure being a peak pressure has been passed and pressure is decreasing.

According to one embodiment a sensor is arranged in the tap unit sensing an opening of the tap unit and if so opening the fluid stop valve unit and closing the fluid stop valve unit when the tap unit is closed. The sensor could for example being a relay.

According to one embodiment the dampening chamber is arranged as a housing surrounding the liquid valve unit. This provides a compact unit which easily may be fitted inside a wall close to the tap unit or even within a tap unit.

According to one embodiment the damping chamber is arranged separately from the liquid valve unit.

According to one embodiment the dampening chamber has a free inner space.

According to one embodiment the dampening chamber is provided with an innermost, closed compartment having a pre-set pressure. This could be an advantage when dampening small volumes, i.e. short conduits.

According to one embodiment the compartment is divided by means of a membrane or a piston.

Further features and advantages will appear from the detail description below where different embodiments of the present invention are disclosed.

BRIEF DESCRIPTION OF THE DRAWINGS

The present invention will now be described in more detail under referral to appended drawings, in which.

DETAILED DESCRIPTION OF EMBODIMENTS OF THE INVENTION

Figure 1:
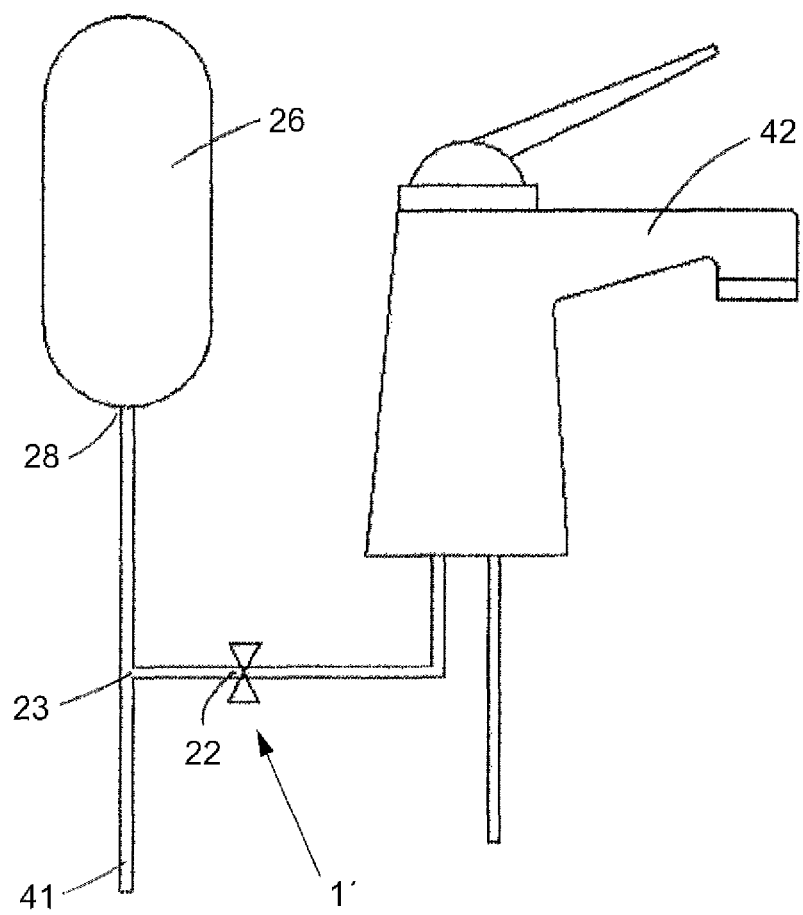
FIG. 1 shows an embodiment of a dampening valve unit.

In FIG. 1 a general embodiment of a dampening valve unit 40 of the invention is shown. The dampening valve unit 40 comprises a dampening chamber 26 and a liquid stop valve unit 1'. Both an inlet end 28 of the dampening chamber 26 and an inlet end 22 of the liquid stop valve unit 1' are connected to at least one conduit 41 in use, preferably via a passage 23. An outlet end 24 of the liquid stop valve unit 1' is connected to a liquid tap unit 42 in use. In FIG. 1 the dampening chamber 26 is provided separately but as will be shown below it is possible to house the liquid stop valve unit 1' inside the dampening chamber 26. Below different embodiments of different parts of the inventive dampening valve unit 40 will be described which may be combined in any possible way unless contradictory.

Figure 2:
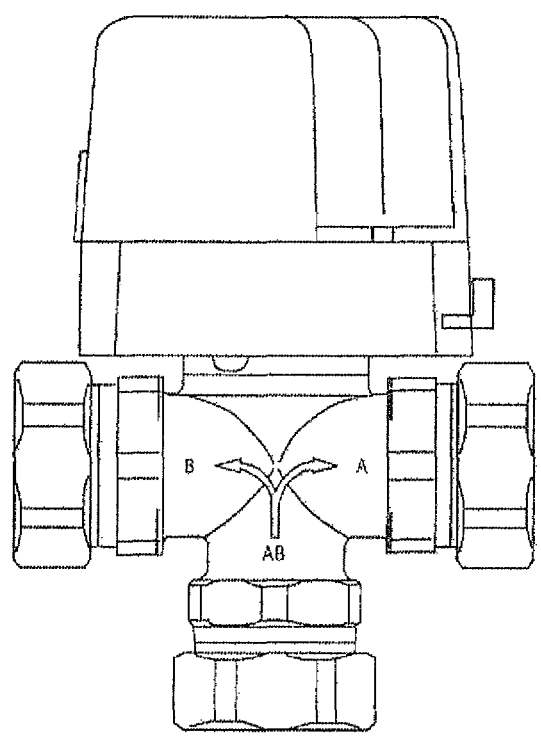
FIG. 2 shows an embodiment of a fluid stop valve unit having a solenoid valve or a motor valve.

The liquid stop valve unit 1' may comprise any type of liquid valve 2. For example it may be a solenoid valve or any type of motor driven valve or a valve driven by pneumatics or hydraulics, examples are shown in FIG. 2. According to an exemplified valve, at refilling gas is flowing through B into the dampening chamber 26 until liquid is sensed at the valve. Then the valve is switched over to let liquid flow through A to the tap unit 42. A sensor may be arranged in the system, for example in the liquid tap unit 42, in order to sense an opening or closing of the liquid tap unit 42. This may even be a relay arranged in the liquid tap unit 42. A sensor for sensing a physical variable, such as pressure, may be arranged in the dampening chamber 26, conduit 41 or downstream the liquid stop valve 2, seen in the flow direction when the liquid stop valve 2 is open. A signal from the sensor may be used to control the opening or closing of the liquid valve unit 1'.

According to another embodiment the liquid valve 2 comprises a pressure responsive part 3 and is kept in a closed state, by default, for example by being biased towards a closed state or by inherent forces kept closed, until a threshold pressure has been reached. This part 3 may be integrally or separately arranged in the liquid valve 2. Preferably, the liquid valve unit 1' comprises at least one non-return valve.

In FIG. 2 a schematic view over a solenoid or a motor valve is shown. The fluid stop valve unit 1 may be controlled by sensing the pressure and acting upon that using a solenoid valve, a motor valve, pneumatics or hydraulics. According to an exemplified valve, at refilling, gas is flowing through B into the dampening chamber 26 until liquid is sensed at the valve. Then the valve is switched over to let liquid flow through A to the tap unit 42. It is also possible to let B stay open while A is open.

Figure 3:
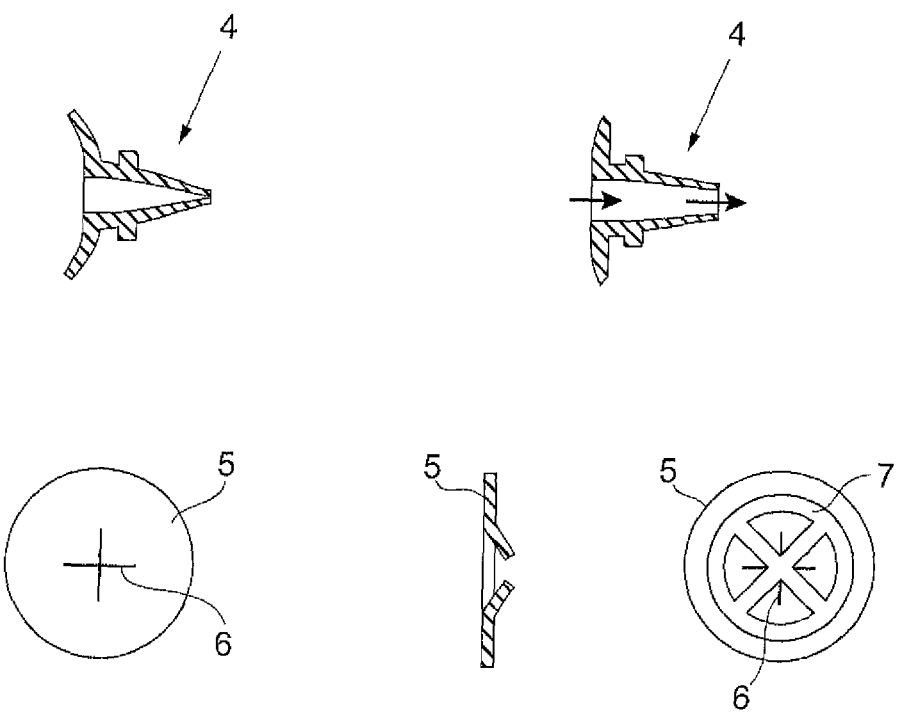
FIG. 3 shows a number of embodiments of a fluid stop valve unit wherein the pressure responsive part is a made of rubber or elastomer.

In FIG. 3 different examples of liquid stop valves 2 are shown which comprise a pressure responsive part 3 made of rubber or elastomer. For example it could be a duck bill valve 4, where the pressure responsive part 3 is integrated as an inherent characteristic of the material, or a membrane 5 having at least one slit 6. If the membrane 5 valve is supported 7 on one side the membrane 5 it will only let fluid through in one direction.

Figure 4A:
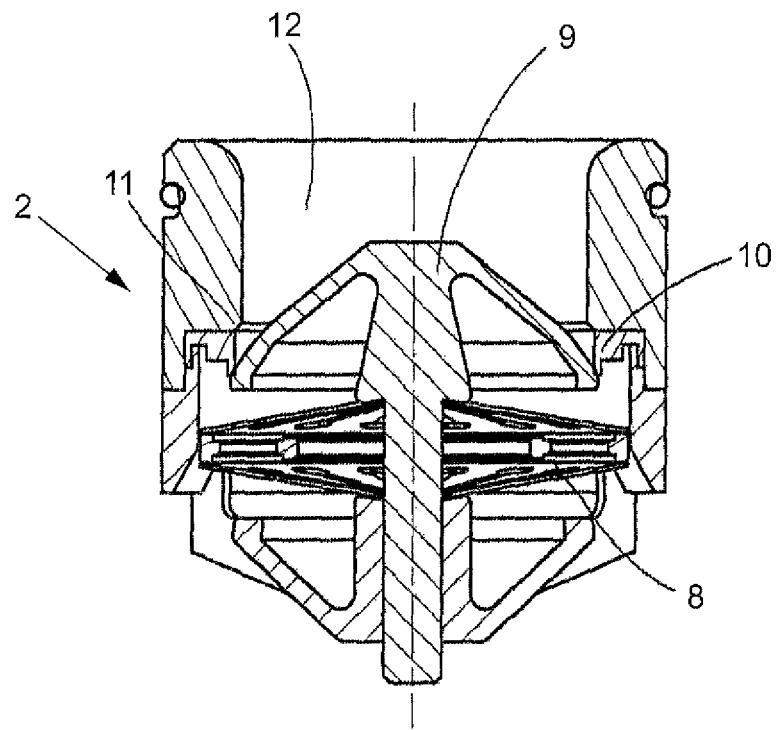
FIGS. 4a and b shows an embodiment where the pressure responsive part is an integrated spring.
Figure 4B:
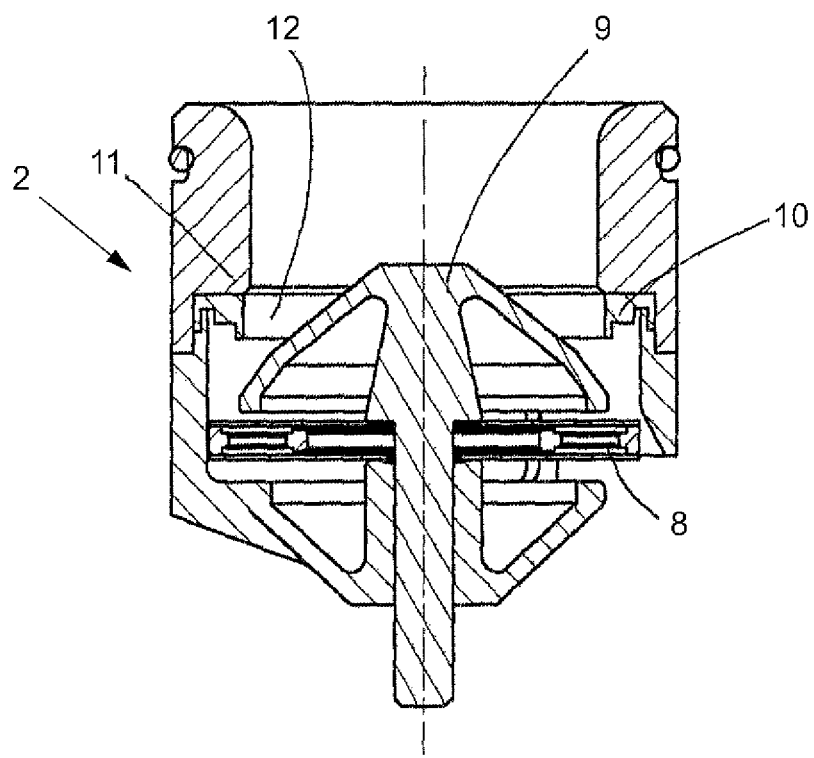

In FIGS. 4a and b an embodiment of the liquid stop valve 2 is shown where the pressure responsive part 3 is a spring 8, which is integrated in the valve 2. The liquid stop valve 2 is shown in two states, a closed state FIG. 4a and an open state FIG. 4b. In FIG. 4a a valve body 9 is in sealing contact with a seal 10 arranged in a valve seat 11 so that no liquid may flow through a liquid channel 12. A spring 8 bias the valve body 9 towards the seal 10 so that the valve is kept in a closed state until a pressure reaches a threshold level, i.e. over winning the biasing spring force and thus compress the spring 8, whereby the valve body 9 deflects towards an open state, as shown in FIG. 4b. In the shown embodiment two diaphragm springs of metal, arranged in a mirrored way, are used although it is possible to use only one spring or an elastomer type of spring, for example. It is also conceivable to have more than two diaphragm springs arranged in a stack.

Figure 5:
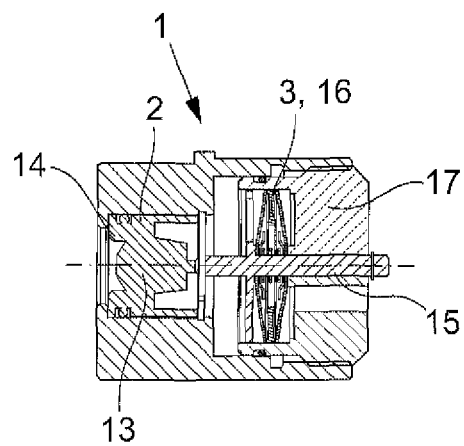
FIG. 5 shows an embodiment where the pressure responsive part is a separate spring.

In FIG. 5 an embodiment of a liquid stop valve unit 1' is shown having a separate pressure responsive part 3, in this case a separate spring 16. For example, this could be an elastomeric membrane spring or a metal diaphragm spring. Preferably the spring is of metal and has spring fingers, see FIG. 7. A liquid stop valve 2 is arranged in series with the spring 16. For example the liquid stop valve 2 may be a non-return valve having an internal coil spring (not shown) with a constant spring characteristic and a valve body 13 biased by this coil spring towards a valve seat 14. A central axle 15 is arranged from the valve body 13 in the flow direction of the fluid in the open state. At the axle 15 the spring 8 is fixedly attached and resting in a housing 17. The spring 16 may have a characteristic as described below, see FIG. 6. When a threshold pressure is reached the non-return valve 2 opens and the spring 16 will be compressed with a long deflection opening up the liquid stop valve unit 1', letting fluid flow through the liquid stop valve unit 1'.

In order to have a quick refilling of the conduits 41 in the liquid distribution system it is preferred to have a liquid stop valve unit 1' that opens as much as possible in immediately as a threshold pressure has been reached. The pressure responsive part 3 may have an opening characteristics as explained in FIG. 6. A graph is shown explaining the opening characteristics of an inventive fluid stop valve unit 1 comprising at least one fluid stop valve 2 and a pressure responsive part 3. The pressure responsive part 3 may be separately arranged in the fluid stop valve 2 or integrated.

This opening characteristics can be accomplished if the load deflection characteristics curve is in accordance with the suggested curves in the graph such that the deflection is quickly increased, even up to fully open valve, without any increase or incremental increase of load or even a decrease of load after the threshold load has been reached. Curve A shows a characteristic only having an incremental increase of load in order to have a long deflection. Curve B shows a characteristic without any increase of load in order to have a long deflection. Curve C shows a characteristic with a decreasing load and despite this having a long deflection. Thus the fluid stop valve will have a significantly higher flow rate at the same pressure drop or differential pressure across the valve, which will result in a higher flow rate than what would be possible with a common valve with the same required pressure to open.

Figure 6:
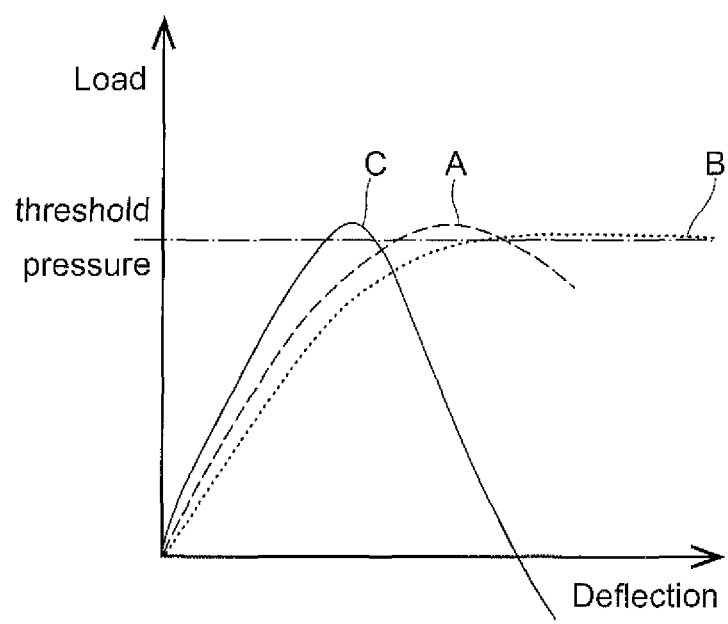
FIG. 6 shows a graph of load deflection characteristics for a fluid stop valve according to the invention.
Figure 7:
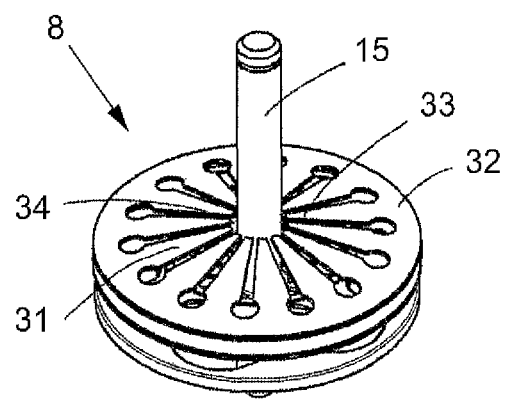
FIG. 7 shows an embodiment of a diaphragm spring having spring fingers.
Figure 7:
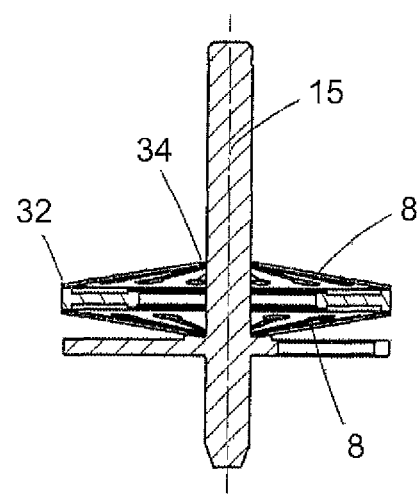

In FIG. 7 a spring 8 is shown having a diaphragm design with spring fingers 31 arranged along a rim 32 of the spring 8 and the fingers 31 pointing with their free ends 33 towards a centre 34. This spring 8 may have one or two resting states and a characteristic as shown in the graph of FIG. 6.

Figure 8:
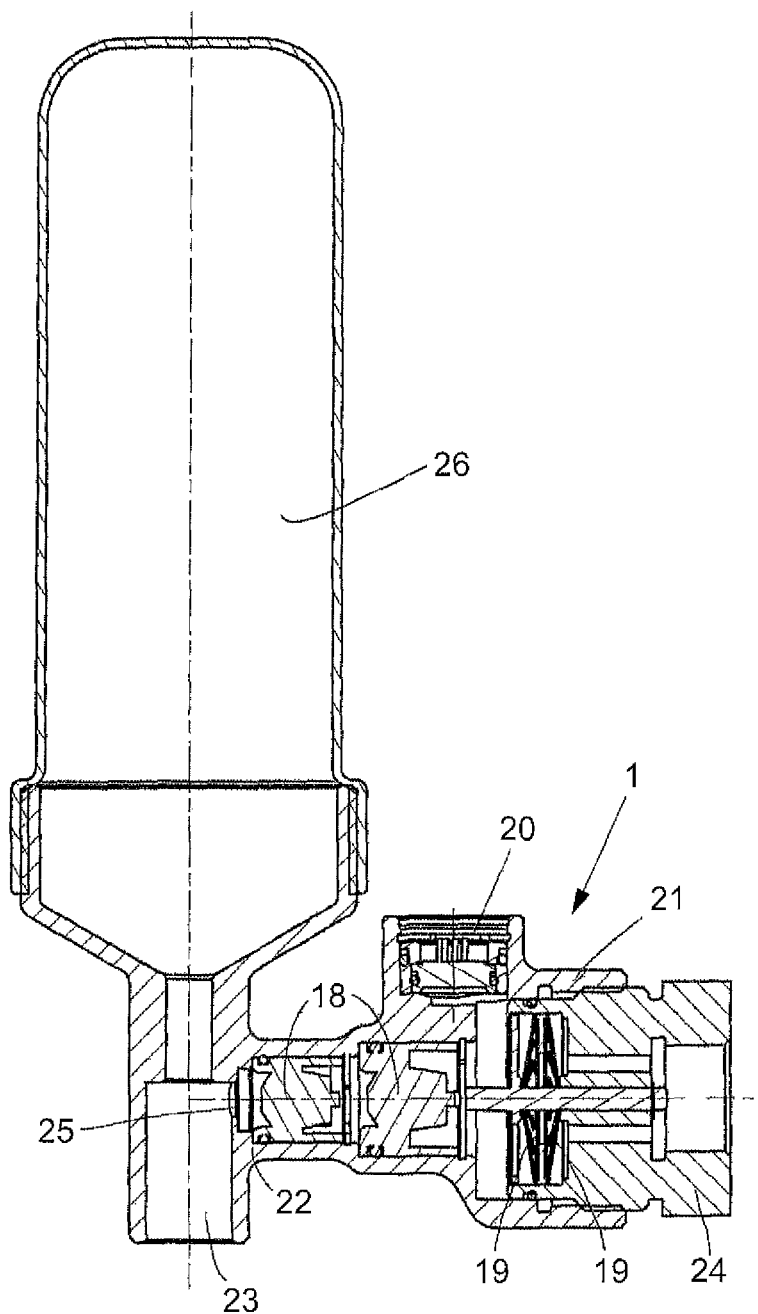
FIG. 8 shows an embodiment of a dampening valve unit with a liquid stop valve unit.

In FIG. 8 a dampening valve unit 40 is shown for use in a liquid distribution system having at least one feeding conduit 41 and at least one tap unit 42. There is a liquid stop valve unit 1' comprising two liquid stop valves 18, preferably non-return valves, arranged in series with also a separate pressure responsive part 3, in the shown case two mirrored diaphragm springs 19. The design is similar to the embodiment of FIG. 5. An inlet side 22 of the liquid stop valve unit 1' is connected to a conduit 41, via a passage 23 comprised in the dampening valve unit 40, in use. An outlet end 24 is connected to the tap unit 42, in use. A pressure sensor 20 is provided in a housing 21 for sensing the pressure downstream the valves 18 in the flow direction towards the tap unit.

At least one small orifice liquid conduit/opening 25 is provided at the inlet end 22 of the liquid stop valve unit 1', which is open at its first end towards the feeding conduit 41 and passage 23 in use and to the at least one liquid stop valve 1' at its second end. The at least one small orifice liquid conduit or opening 25 is capable of keeping liquid inside it even when the feeding conduit or passage 23 is evacuated of liquid in use. This could be accomplished by means of capillary forces, for example. When liquid is reaching the at least one small orifice or opening and the pressure of the liquid has reached a threshold level the at least one liquid stop valve 18 will open and due to the separate spring 19 the opening characteristics will be as shown in FIG. 6. The small orifice opening is preferably close to the inlet 22 of the liquid stop valve unit 1'. A dampening chamber 26 is provided separately, although it is also conceivable to arrange the liquid stop valve unit inside the dampening chamber 26. The inlet to the dampening chamber is arranged at the passage 23.

Figure 9:
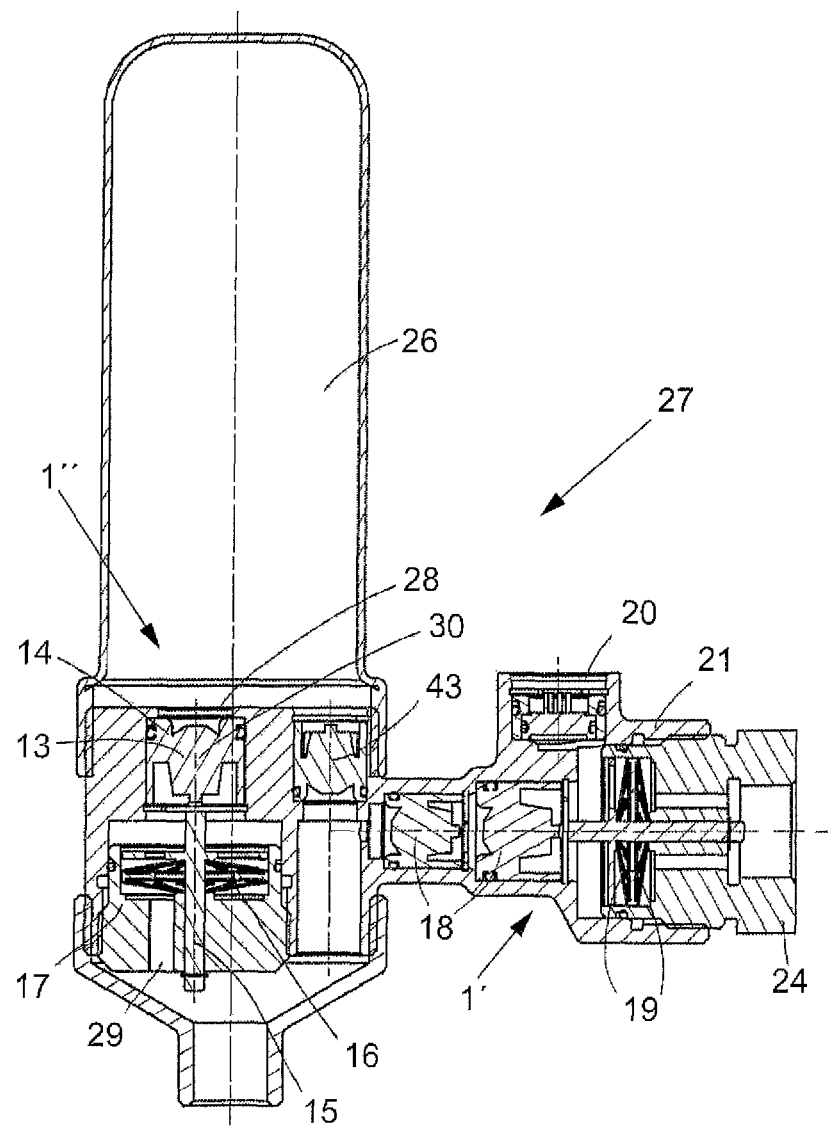
FIG. 9 shows an embodiment of a dampening valve unit with both a liquid stop valve unit and a gas stop valve unit.

In FIG. 9 two fluid stop valves 1', 1" are arranged in a dampening valve unit 27. One unit 1' is a liquid stop valve unit similar to the embodiment of FIG. 8. The other unit 1" is a gas stop valve 1", for use in a liquid distribution system having at least one feeding conduit 41 and at least one tap unit 42. The gas stop valve unit 1" has an inlet end 28 which is arranged to be connected to a gas dampening chamber 26 in use and an outlet end 29 arranged to be connected to the liquid feeding conduit 41 in use. A gas inlet valve 43, preferably a non-return valve, is provided for letting gas into the dampening chamber 26 when a threshold pressure has been reached. For example the pressure threshold may be less than 0.1 bar.

The gas stop valve unit 1" shown has a separate pressure responsive part 3, in this case a separate spring 16. For example, this could be an elastomeric membrane spring or a metal diaphragm spring. Preferably the spring is of metal and has spring fingers, see FIG. 7. A gas stop valve 30 is arranged in series with the spring 16. For example the gas stop valve 30 may be a non-return valve having an internal coil spring (not shown) with a constant spring characteristic and a valve body 13 biased by this coil spring towards a valve seat 14. A central axle 15 is arranged from the valve body 13 in the flow direction of the gas in the open state. At the axle 15 the spring 16 is fixedly attached and resting in a housing 17. The spring 16 may have a characteristic according to FIG. 6. When a threshold pressure is reached the non-return valve 30 opens and the spring 16 will be compressed with a long deflection opening up the gas stop valve unit 1", letting gas flow through the gas stop valve unit 1". If the spring 16 has two resting positions the spring may stay in an open position and will thus need an initiating pressure from the gas being pushed in front of the liquid during refilling. For example a plate or the like (not shown), area increasing, arranged at the free end of the axle 15 could help transferring pressure to a closing movement of the spring 16. The gas stop valve unit 1" may for example open when a pressure difference between the inlet end 28 and the outlet end 29 is more than 2 bar, preferably more than 3 bar. Also in this embodiment the dampening chamber 26 is arranged separately.

Figure 10:
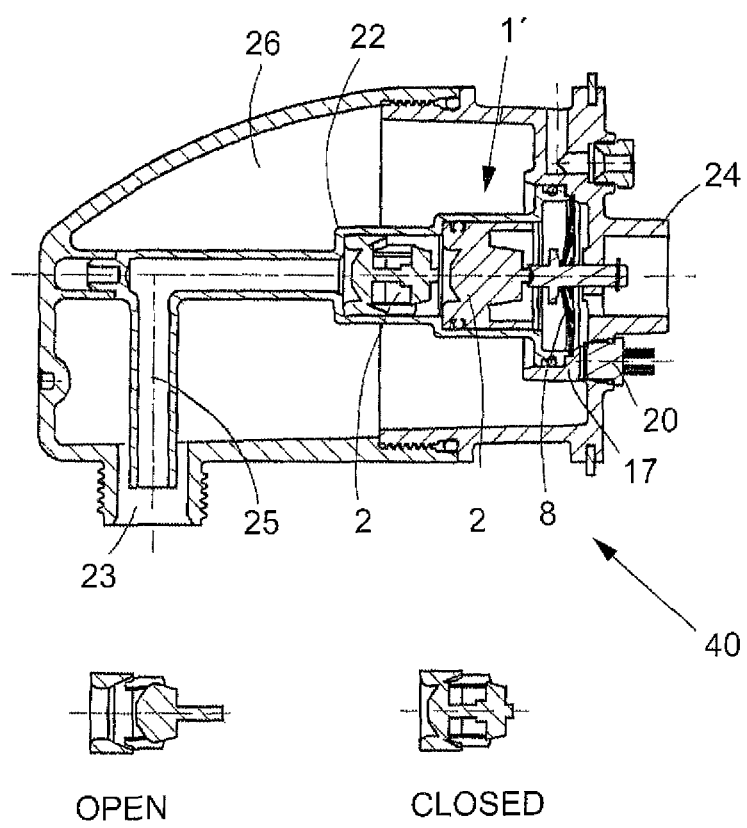
FIG. 10 shows an embodiment of a dampening valve unit wherein a liquid stop valve is arranged inside a dampening chamber.

In FIG. 10 the liquid stop valve unit 1' is arranged within the dampening chamber 26 providing a compact dampening valve unit 40. Here the small orifice conduit 25 is much longer than previously shown, where it has been more of an opening. When liquid is reaching the passage 23 and the inlet of the small orifice conduit the liquid stop valve 1' will open and let the liquid flow towards and out of the tap unit 42. The gas, such as air, being pushed in front of the liquid during refilling of the feeding conduit 41, will be locked and compressed inside the dampening chamber 26. One of the two fluid stop valves 2 is shown in detail in both an open and closed state.

Figure 11:
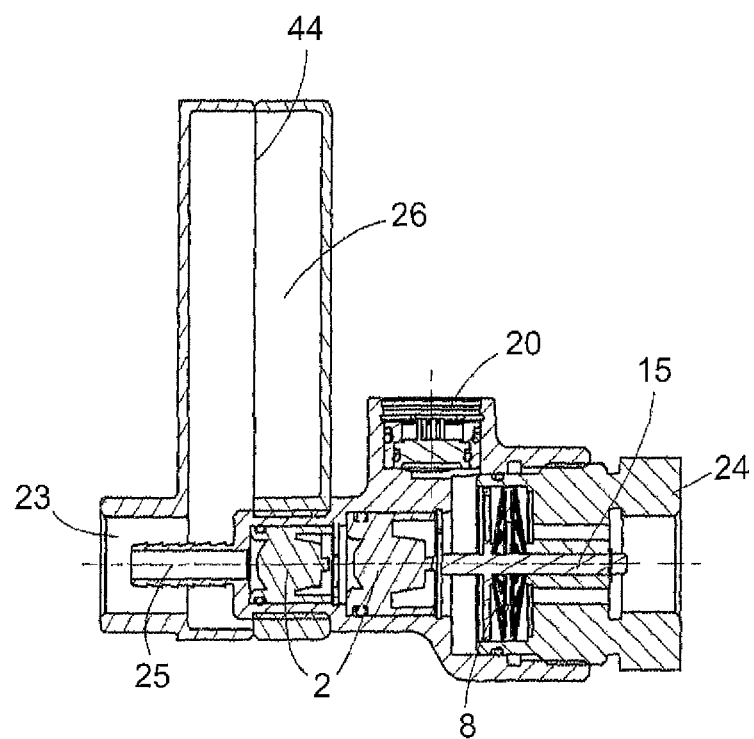
FIG. 11 shows an embodiment of a dampening chamber.

In FIG. 11 another embodiment of a dampening valve unit 40 is shown. A dampening chamber 26 is provided with liquid valve unit 1' reaching through its inlet end and with the small orifice conduit 25 through the passage 23. The shown dampening chamber 26 is welded along a welding joint 44.

Figure 12:
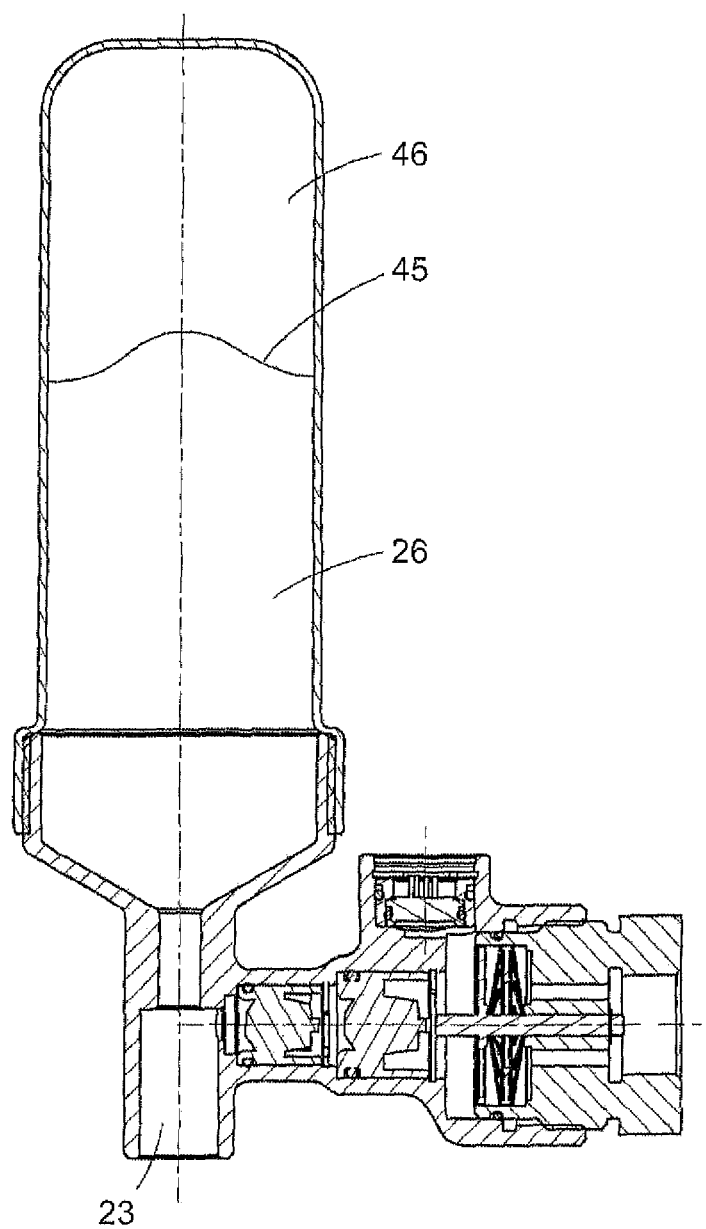
FIG. 12 shows another embodiment of a dampening chamber.
Figure 13:
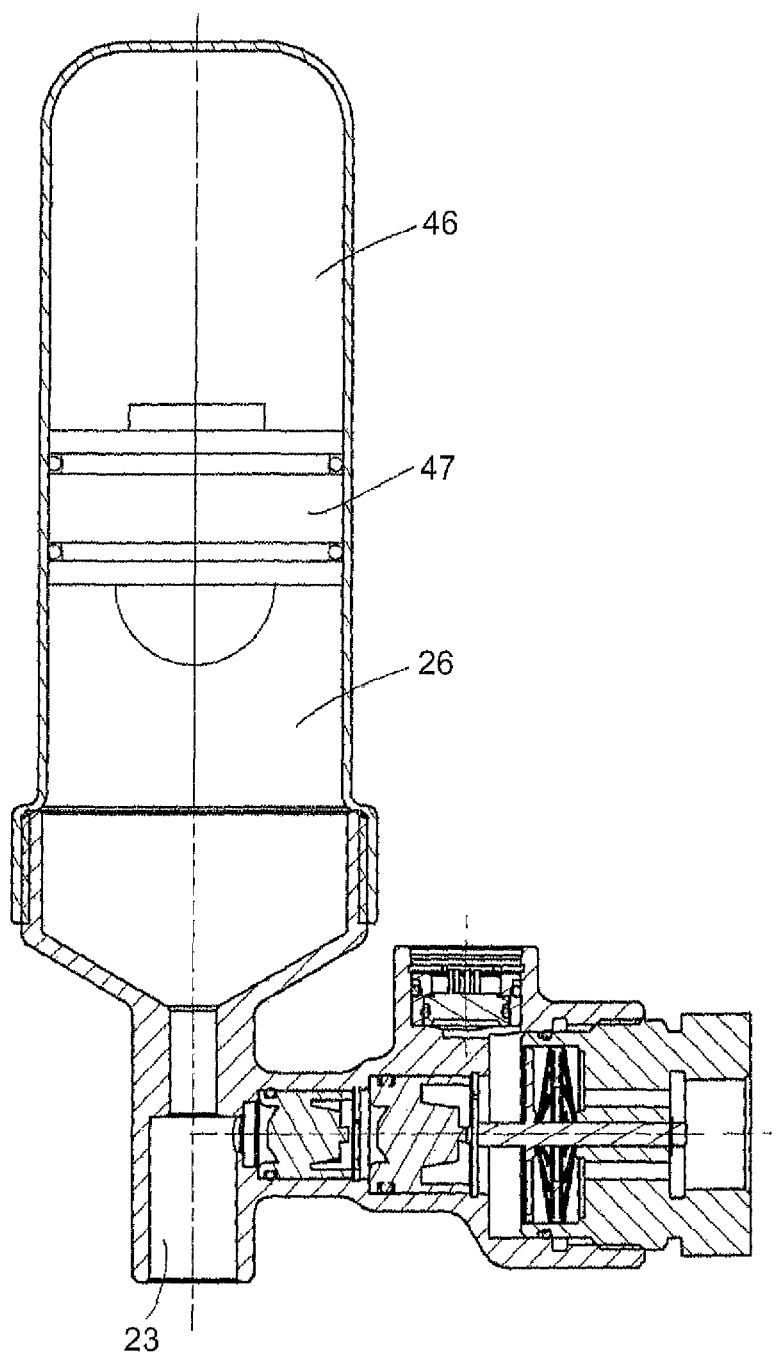
FIG. 13 shows a further embodiment of a dampening chamber.

In FIG. 12 an embodiment of a dampening chamber 26 is shown comprising an innermost, closed compartment 46 having a preset pressure. In the shown embodiment the closed compartment 46 is divided off by means of a membrane. This could also be accomplished with a movable wall 47, functioning as a piston, as shown in FIG. 13.

Figure 14:
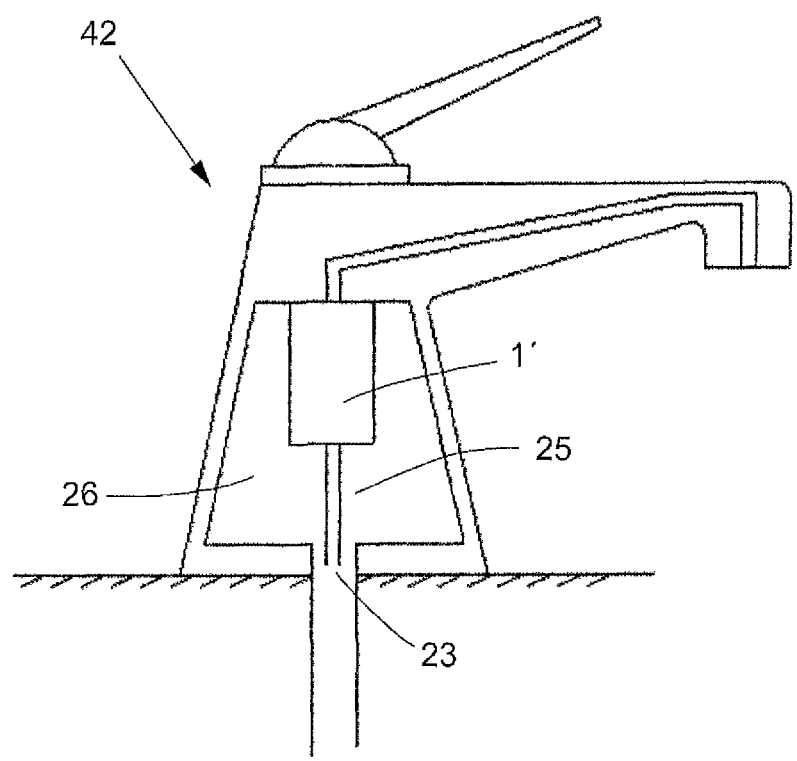
FIG. 14 shows a tap unit comprising a dampening valve unit.

In FIG. 14 the dampening valve unit 40 is provided inside a tap unit 42 in a very compact embodiment. Also in this embodiment is the liquid valve unit 1' arranged inside the dampening chamber 26. The small orifice conduit 25 reaches below the bottom of the dampening chamber and into the passage 23 of the end of the feeding conduit 41 so that when the conduit 41 is refilled the liquid valve unit 1' will open when the water has reached the conduit and thereby not risking leakage of gas, such as air, through the tap unit 42.

Figure 15A:
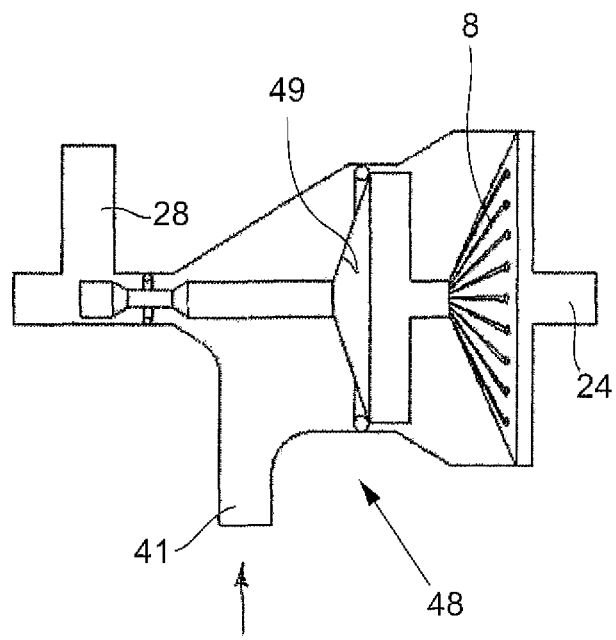
FIGS. 15a and b shows a switching fluid valve.
Figure 15B:
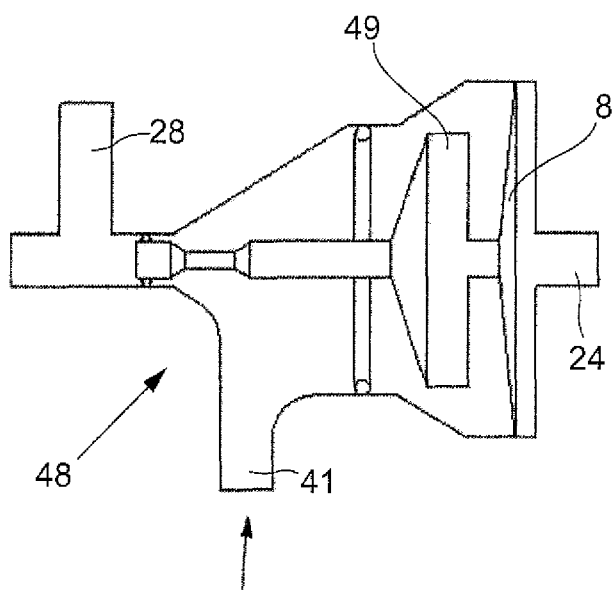

FIGS. 15*a* and *b* shows two states of a combined liquid and gas valve unit 48. In FIG. 15*a* a valve body 49 is movable between to positions. The one shown in FIG. 15*a* is when it is open for gas into the dampening chamber via its inlet 28. The gas is coming from the feeding conduit 41 during refilling of liquid. When the liquid reaches the combined valve unit 48 the pressure of the liquid forces the valve body 49 against the force of the spring 8 to the second position where the valve is closed for gas but open for liquid through the valve 48 through the outlet 24 towards the tap unit 42.

Finally, an idea of threshold pressures will be described. A liquid stop valve 1' could have a threshold pressure of at least 25-50% of the system pressure if there isn't any gas valves 1", 43 at the dampening chamber 26. The threshold pressure could for example be an overpressure of at least 1-2 bar over atmospheric pressure. On the other hand, when gas valves 1", 43 are present at the dampening chamber 26, the liquid stop valve 1' could open at 50-75% of the system pressure, for example. An advantage of having a threshold pressure in this range is that the volume of the damping chamber may be kept smaller since the gas pressure therein may be higher without any risk of leaking gas out through the liquid stop valve 1'. The closing pressure could be as low as 0.1 bar. Due to this characteristic of the fluid stop valve the risk of hammering in the conduits will be minimized. Additionally, it will also minimize the risk of closing the fluid stop valve if a sudden pressure drop in the system would occur. The required threshold pressure across the valve to open it, is several times higher than the required pressure across the valve to hold it in an open position. Therefore, with a given system pressure available, the critical flow rate will be significantly higher due to low pressure drop across the valve compared with a common valve with a linear opening/closing characteristic.

A lot of different embodiments of different parts of a dampening valve unit has been described and the different embodiments of parts may be combined into a dampening valve unit in any possible way as long it is not contradictory.

The invention claimed is:

1. A dampening valve unit, the dampening valve unit comprising a dampening chamber adapted to collect gas, and a liquid stop valve unit, which is connected in use, at an inlet end thereof, to at least one associated feeding conduit and which has an outlet end being connected in use to at least one associated liquid tap unit, wherein said dampening chamber is for use in a liquid distribution system having a centrally located liquid source connected via the at least one associated feeding conduit to the at least one associated liquid tap unit, wherein the at least one associated feeding conduit is evacuated of liquid after the at least one associated liquid tap unit is closed and refilled with liquid after the at least one associated liquid tap unit is opened, said dampening chamber being connected in use to the at least one associated feeding conduit, via a passage of the dampening valve unit, said inlet end of said liquid stop valve unit also being connected to said passage, said passage being located before said liquid stop valve unit in a flow direction from the passage toward the at least one associated liquid tap unit when the liquid stop valve is open and the dampening chamber is adapted to collect gas during a refilling of the at least one associated feeding conduit.

2. The dampening valve unit according to claim 1, wherein the liquid stop valve unit comprises at least one non-return valve.

3. The dampening valve unit according to claim 1, wherein a pressure responsive part, separate or integrated, is provided in the liquid stop valve unit which biases the at least one liquid stop valve in a closed state.

4. The dampening valve unit according to claim 3, wherein the pressure responsive part, integrated or separate, having an opening characteristic going from the closed state to an open state with no or a slight increase of pressure or a decrease of pressure after a threshold pressure has been reached.

5. The dampening valve unit according to claim 3, wherein the pressure responsive part is a spring.

6. The dampening valve unit according to claim 5, wherein the spring has a non-linear load-deflection characteristic curve with a horizontal or negative portion, thus providing a long deflection after a threshold pressure has been reached.

7. The dampening valve unit according to claim 1, wherein at least one orifice liquid conduit or opening is connected to the passage at a first end thereof and to the inlet end of said at least one liquid stop valve at a second end thereof, the at least one orifice liquid conduit or opening being capable of keeping liquid inside of it even when the passage is evacuated of liquid due to a size so small that capillary forces keep the liquid inside.

8. The dampening valve unit according to claim 7, wherein the at least one liquid stop valve opens when liquid and a threshold pressure reaches the first end of the at least one small orifice liquid conduit or opening.

9. The dampening valve unit according to claim 1, wherein at least one gas stop valve is present at the inlet of the dampening chamber.

10. The dampening valve unit according to claim 9, wherein an inlet valve is provided for letting gas into the dampening chamber and the gas stop valve is provided for letting gas out of the dampening chamber, the gas stop valve is provided with a pressure responsive part, the pressure responsive part, integrated or separate, having an opening characteristic going from the closed state to an open state with no or a slight increase of pressure or a decrease of pressure after a threshold pressure has been reached.

11. The dampening valve unit according to claim 10, wherein the inlet valve opens at less than 0.1 bar pressure and the gas stop valve opens at a pressure difference of at least 2 bar.

12. The dampening valve unit according to claim 1, wherein a sensor for sensing pressure or another physical variable is provided downstream the at least one liquid stop valve in the liquid flow direction when the tap unit is open.

13. The dampening valve unit according to claim 1, wherein the dampening chamber is arranged as a housing surrounding the liquid stop valve unit.

14. The dampening valve unit according to claim 1, wherein the dampening chamber is arranged separately from the liquid valve unit.

15. The dampening valve unit according to claim 14, wherein the dampening chamber has a free inner space.

16. The dampening valve unit according to claim 14, wherein the dampening chamber is provided with an innermost, closed compartment having a pre-set pressure.

17. The dampening valve unit according to claim 16, wherein the compartment is divided by means of a membrane or a piston.

* * * * *